United States Patent [19]

Lender

[11] 4,110,691
[45] Aug. 29, 1978

[54] APPARATUS AND METHOD FOR DETECTING ERRORS IN A 7-LEVEL CORRELATIVE SIGNAL

[75] Inventor: Adam Lender, Palo Alto, Calif.

[73] Assignee: GTE Automatic Electric Laboratories, Incorporated, Northlake, Ill.

[21] Appl. No.: 777,485

[22] Filed: Mar. 14, 1977

[51] Int. Cl.² .............................................. H04L 1/10
[52] U.S. Cl. ............................. 325/41; 340/146.1 AB
[58] Field of Search ............................ 325/38 A, 41; 340/146.1 R, 146.1 AB, 146.1 BA

[56] References Cited

U.S. PATENT DOCUMENTS

| | | | |
|---|---|---|---|
| 3,409,875 | 11/1968 | De Jager | 325/41 |
| 3,418,631 | 12/1968 | Sipress | 325/41 |
| 3,457,510 | 7/1969 | Lender | 325/41 |
| 3,492,578 | 1/1970 | Gerrish | 325/41 |
| 3,601,702 | 8/1971 | Lender | 325/38 A |
| 3,747,065 | 7/1973 | Gibson | 325/41 |
| 3,757,296 | 9/1973 | Gibson | 325/41 |

Primary Examiner—Robert L. Griffin
Assistant Examiner—Michael A. Masinick
Attorney, Agent, or Firm—Leonard R. Cool; Russell A. Cannon

[57] ABSTRACT

The correlation properties of a 7-level correlative waveform permit detection of errors due to irregularities and impairments in the transmission facility, where these errors violate the correlation patterns of the waveform. The received 7-level correlative waveform is first decoded to obtain a pair of binary outputs which are representative of the original binary signal at the transmitter, except for errors that might have occurred during the transmission period. The pair of binary signals are operated on to obtain coded binary signals and their delayed counterparts. These coded binary signals are used to establish the effect of presence or absence of a top or bottom level that would result from the formation of a nonbinary correlative signal. If an error has occurred during transmission, the extreme levels of the locally generated signal will not normally coincide with those of the received signal. To determine if an error has occurred it is necessary to compare the extreme levels of the incoming waveform with those locally generated. Thus, the decoder provides the bottom and top level outputs which are compared with the extreme levels of the equivalent signal from the binary coded signals, and when occurrences of extreme levels of the two signals differ, it is an indication that an error has occurred. The error indication results in an output signal from the error detector circuitry.

8 Claims, 8 Drawing Figures

APPARATUS AND METHOD FOR DETECTING ERRORS IN A 7-LEVEL CORRELATIVE SIGNAL

BACKGROUND OF THE INVENTION

1. Field of the Invention

This invention relates to error detection in nonbinary correlative systems, and more particularly to error detection for a 7-level correlative signal.

2. Description of the Prior Art

The method of generating, recovering and detecting errors in multilevel nonbinary systems has been disclosed in my invention which issued as U.S. Pat. No. 3,601,702. It was there noted that the correlation properties of the transmitted wave can be used to detect errors and thus obviate the need of introducing redundant digits into the input binary data. Logic and sampling circuits provide a replica of the binary input data in parallel form except for errors that might have occurred in the transmission of the waveform. This binary data is coded in exactly the same way as in the transmitter. The principle is to ascertain which of the extreme levels, i.e., top and bottom levels, correspond to the present and past digits emanating from the decoder and digital memory. A comparison is made at the sampling instant of the digit. If there is a disagreement, an error is indicated and the memory is reset to the correct state. Such a comparison is done when the extreme levels are present because only the extreme levels are formed in a unique way in the correlative systems. Intermediate levels may be formed in more than one way and therefore are not suitable for the detection of errors. A similar result is achieved by the present invention but this is accomplished by means of novel logic arrangements as will be described hereinbelow.

SUMMARY OF THE INVENTION

In a digital communication system employing a 7-level correlative coded signal, a receiver decodes the received 7-level signal, C, to obtain a pair of binary output signals which represent the original data, excluding errors introduced during transmission. The decoder also provides a separate signal for each occurrence of either the top or the bottom level of C. The pair of binary signals are operated on by an estimated waveform generator to derive in binary form an estimate, (Ĉ), of the received correlative 7-level signal, C. The occurrences of the top and bottom levels of the incoming waveform C with the estimated waveform Ĉ is used to determine whether errors have occurred in transmission. When such errors occur the error detector provides an error output signal.

DESCRIPTION OF THE PREFERRED EMBODIMENT

Figures 1A, 1B, 1C:
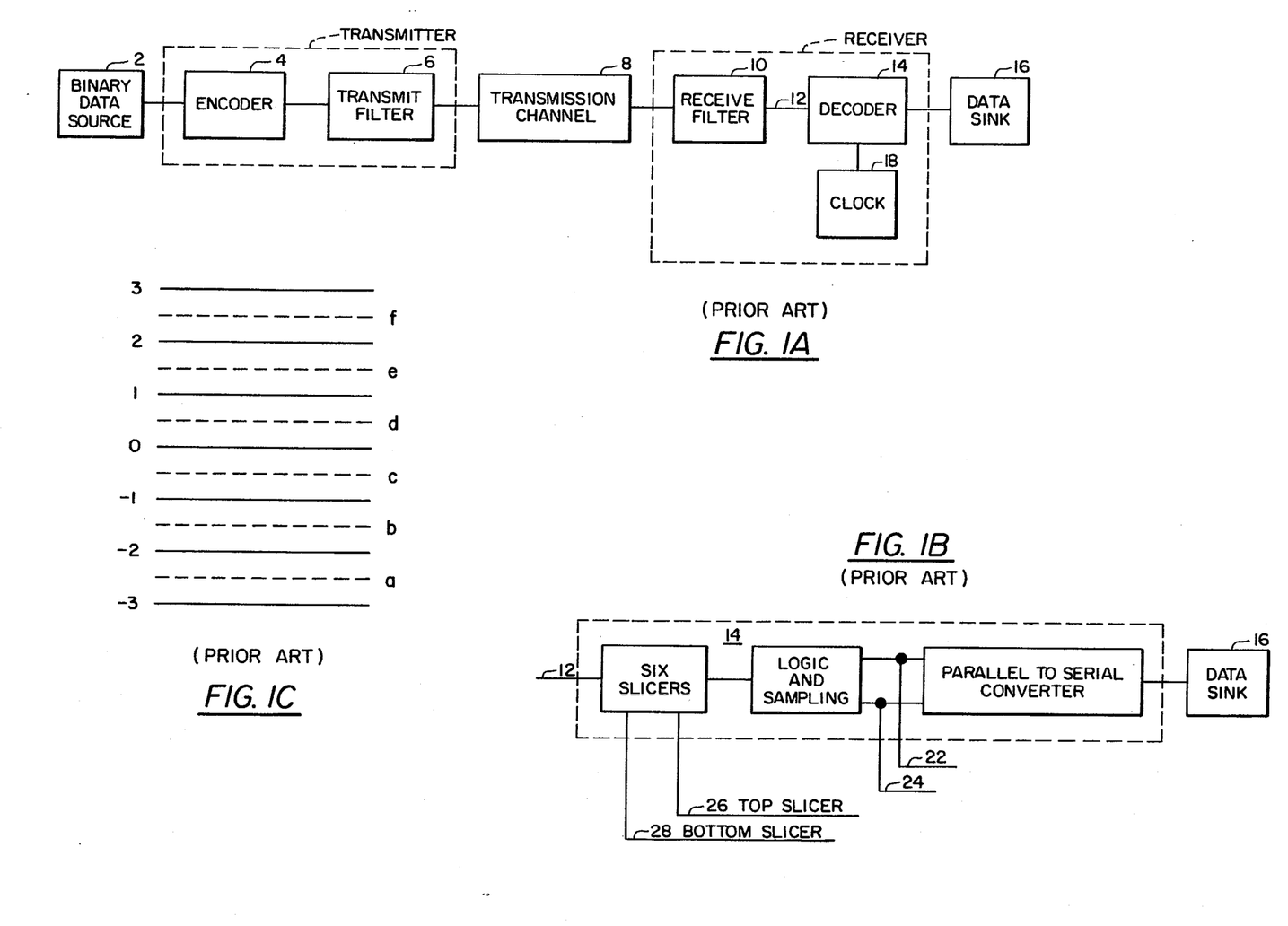
FIG. 1A is a simplified schematic diagram of a prior art system which employs nonbinary correlative techniques.
FIG. 1B is a more detailed block diagram of the decoder 14 shown in FIG. 1A and this is also illustrated in the prior art.
FIG. 1C is a prior art representation of the slicing levels which occur for a 7-level correlative waveform.

Referring now to FIG. 1A, there is shown, in block diagram form, a communication system including a transmitter and receiver which employ nonbinary correlative techniques. Considering first the transmitter portion of the system, binary data in serial form consisting of marks and spaces is applied from binary data source 2 to encoder 4. For a 7-level system the basic coding is applied to a pair of parallel binary bit streams. In order to obtain these parallel binary bit streams, the serial binary data is first applied to a serial-to-parallel converter, not shown. However, such converters are well known in the art. Following encoding of the parallel binary bit streams the coded binary may be combined in a 4-level converter such as described in U.S. Pat. No. 3,601,702 or the coded parallel binary bit streams may be directly converted in a 7-level digital signal as is described in my co-pending application Ser. No. 772,797, filed Feb. 28, 1977. The converted signal is now applied to transmit filter 6 which in the case of the patent is a bandpass filter having a shaping characteristic proportional to a half-cycle sinusoid in frequency with a zero transmission at DC and at an upper frequency that is numerically equal to one-half of the nonbinary digit rate at the input of the filter. The effect of the filter having this characteristic is to subtract each second previous digit from the present nonbinary digit, in addition to shaping the waveform.

The 7-level nonbinary correlative signal is then transmitted through transmission facilities which may consist of cables or carrier systems providing telephone voice channels. The transmission channel is represented as block 8 in the diagram.

A receiver at the remote end of the transmission medium, recovers the intelligence contained in the serial binary data applied to the transmitter and supplies this binary data to the data sink 16. It should be noted that a receive filter 10 is included in the receiver. This filter may supplement that of the transmit filter in the conversion process as is described in my co-pending application Ser. No. 772,797, filed Feb. 28, 1977. It should be further noted that the received nonbinary waveform is equalized and amplified prior to decoding. The decoder 14 is illustrated in more detail in FIG. 1B since the outputs from decoder 14 are necessary inputs to the error detection circuitry of my invention.

It should be recalled that the interpretation of the 7-level waveform is modulo 4 so that the levels uniquely correspond to the parallel binary representation without resorting to the past history of the waveform. In order to recover the information at the receiver, it is first necessary to determine the amplitude level of the nonbinary signal at the sampling point. This is readily accomplished by well-known slicing techniques, it being apparent that the number of slicers required is one less than the number of levels. In the present case, the required number of slicers is six. Being well-known, it is believed unnecessary to describe a specific implementation of the slicers represented by the block encoder 14 of FIG. 1B. Suffice it to say, that the slicers may be on-off threshold level detectors which establish slicing levels midway between adjacent amplitudes as shown by the dashed lines in FIG. 1C. Recovery of the orginal data information is based upon simple logic, according to the following rules:

(1) At the extreme levels, namely, at 3 and −3, only the adjacent slicer is involved. For the uppermost level, 3 in the illustrated example, the adjacent slicer must have an output, i.e., slicer $f$ must have an output. Similarly, for the lowermost level, −3 in this example, the adjacent slicer $a$ must not have an output.

(2) At levels intermediate these two extremes, the two slicers adjacent to the intermediate level of interest are involved, and, more specifically, the slicer above the intermediate level in question must not have an output and the slicer below said level must have an output. The logic and sampling block, shown as a part of decoder 14, FIG. 1B, provides the logic required for the binary representation on a parallel basis; and, thus provides the outputs 22 and 24. The techniques for doing this are well-known and are not described in detail here. Reference may be had to U.S. Pat. No. 3,601,702 for more complete information regarding the recovery of the binary information using such a logic and sampling process. Two other outputs from the decoder 14 are the output from the top slicer on line 26 and from the bottom slicer on line 28. In keeping with the rules set forth above, when a 3 appears there will be an output of $f$ which would be applied to path 26. However, for the bottom slicer it is noted that when a −3 occurs the adjacent slicer $a$ does not have an output. Thus, in order to provide an output pulse on path 28 an inverter would be required either in the decoder 14 or somewhere in path 28.

Figures 2, 4:
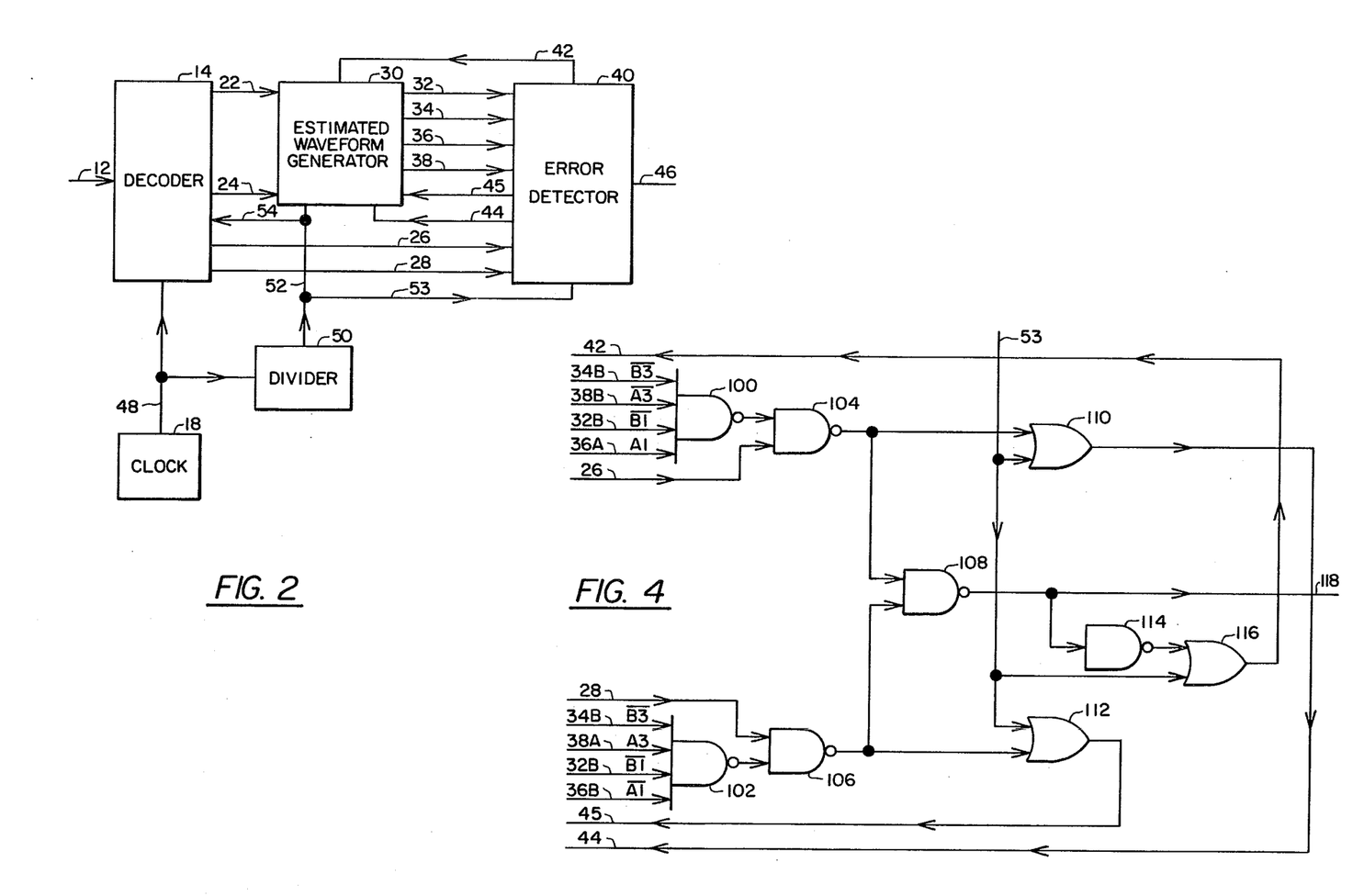
FIG. 2 is a block diagram of a preferred embodiment of applicant's invention.
FIG. 4 is a logic diagram of error detector 40.

Referring now to FIG. 2 which illustrates a preferred embodiment of the invention in simplified block form, it should be noted that the estimated waveform generator 30 and the error detector 40 are the essential elements of the detection technique. A clearer understanding of the invention is obtained by a review of some of the theory involved. As previously stated, the incoming waveform is designated C. This waveform is to be interpreted modulo 4, and the process is as follows:

$$C \bmod 4 = \hat{A} \quad (1)$$

Where $\hat{A}$ = is an estimate of the orginal transmitted waveform.

$$\hat{B} = \hat{A} + \overset{2}{\Delta} \hat{B} \bmod 4 \quad (2)$$

Where the unit delay, $\Delta$, is often designated in literature as D (Reference: "A Linear Circuit Viewpoint on Error-Correcting Codes" - David A. Huffman, IRE Transactions on Information Theory, IT2, pp. 20-28, 1956). D is a delay operator, where the delay is T seconds and 1/T is the digit rate in digits/second. In this case, $\Delta$ rather than D is used to avoid confusion with other capital letters such as A, B, C, etc. $\hat{B}$ is defined by $\hat{A}$ and $\overset{2}{\Delta} \hat{B}$ is $\hat{B}$ delayed by two units, each unit having a duration of T seconds.

$$\hat{C} = \hat{B} - \overset{2}{\Delta} \hat{B} \text{ (algebraic)} \quad (3)$$

where $\hat{C}$ = estimate of C from equations (1), (2) and (3)

$$\hat{C} = [(\hat{A} + \overset{2}{\Delta} \hat{B}) \bmod 4] - \overset{2}{\Delta} \hat{B} \quad (4)$$

In equation (4) the minus sign is algebraic and the plus sign indicates modulo 4 addition. Finally, an error is indicated whenever $$\hat{C} \neq C \quad (5)$$

With respect to the comparison indicated by the relation (5), it is to be noted that this comparison must be done only at extreme levels - top or bottom. Designation of the levels is as follows:

| Decimal | Binary (MOD 4 interpretation) |
|---|---|
| 3 | 10 |
| 2 | 11 |
| 1 | 01 |
| 0 | 00 |
| −1 | 10 |
| −2 | 11 |
| −3 | 01 |

Referring now to the level designations illustrated above, it can be seen that the top and bottom levels, i.e., 3 and −3, are only formed in one way. Level 3 can only be formed by subtracting 0 from 3. This is true because for this correlative system the levels are formed by subtraction using only four numbers: 0, 1, 2 and 3.

Similarly, level −3 can only be formed by subtracting 3 from 0. For any intermediate level such as ±1 or ±2 there is more than one way to form such a level.

From equations (4) and (5) it is clear that the past digits $\overset{2}{\Delta} B$ and the present digit B must be stored for use in the error detection process. Anytime that an error occurs the digits used in the detection process must be corrected for future usage so that the process of error detection can start all over again. Such a correction can be accomplished only when one of the extreme levels is present, since the pattern corresponding to each extreme level is unique and known. Thus, it is only necessary to implement the error detection and error correction processes of the stored digits when one of the extreme levels is present. Therefore, errors are not searched for when one of the intermediate levels appears, since detection of errors and correction of stored digits cannot be accomplished at that time.

The key equation in the implementation is equation (3), above. To form one of the extreme levels, the value of $\hat{B}$ in decimal form is either 3 and 0 and, similarly, for $\overset{2}{\Delta} \hat{B}$. The 3 and 0 correspond, respectively, to 10 and 00 in binary form. Thus, to form the top level, $\hat{B}$ is 3 and $\overset{2}{\Delta} \hat{B}$ is 0. For the bottom level this is reversed. It follows, that in binary form the estimated top extreme level $\hat{C}$ is indicated by the binary digits 1000. Similarly, the bottom level is illustrated in binary form by the digit 0010. Estimate waveform generator 30 accepts the recovered parallel binary waveforms on paths 22 and 24 and converts these to obtain the present and delayed representation in binary form of the estimated waveform $\hat{C}$. This information is applied via paths 32, 34, 36 and 38 in FIG. 2 to error detector 40. Also applied to error detector 40 via paths 26 and 28 are, respectively, the output from the top slicer and from the bottom slicer. Whenever a top level or bottom level occurs on the inputs 26 and 28 to error detector 40, and the estimated waveform does not indicate that the respective top or bottom estimated level has occurred, error detector 40 will output an error indication on path 46. At the same time, the state of $\hat{B}$ is reset to the correct value via paths 42, 44 and 45 from error detector 40 to estimated waveform generator 30. There is no need to reset the state of $\hat{\Delta} \hat{B}$ to the correct value since during the next time interval its value becomes obsolete and is discarded.

As noted above, $\hat{B}$ and $\hat{\Delta} \hat{B}$ are expressed in binary form. $\hat{B}$ corresponds to binary digits E1 and F1, and $\hat{\Delta} \hat{B}$ corresponds to binary digits E3 and F3, where $E_i$ is the most significant and $F_i$ is the least significant digit. Based upon the discussion hereinabove the digits E1, F1, E3, F3 are monitored when C is 3 or −3. Whenever an error occurs only E1 and F1 are reset to their correct values.

Figure 3:
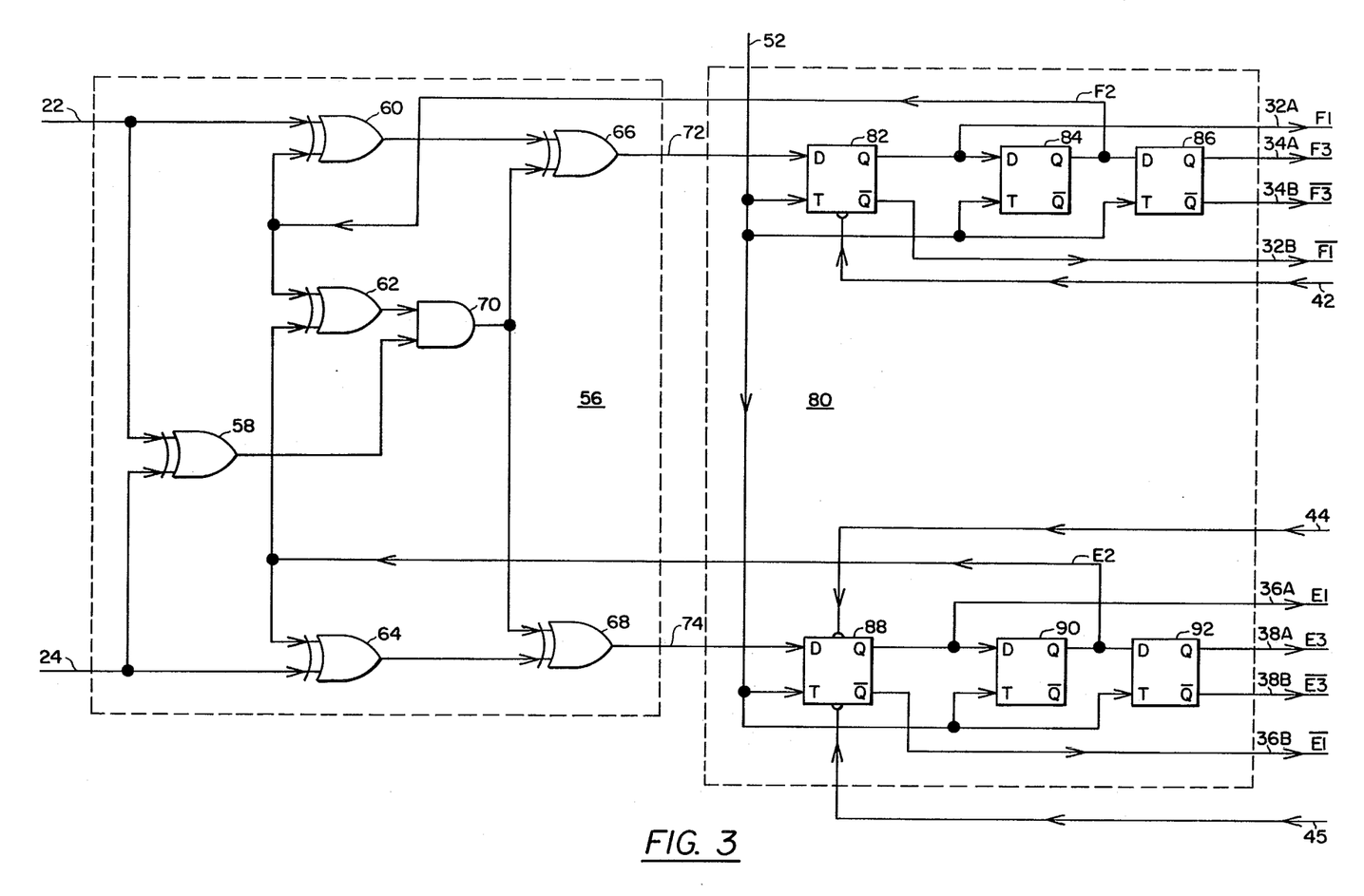
FIG. 3 is a logic diagram of estimated waveform generator 30.
Figure 5:
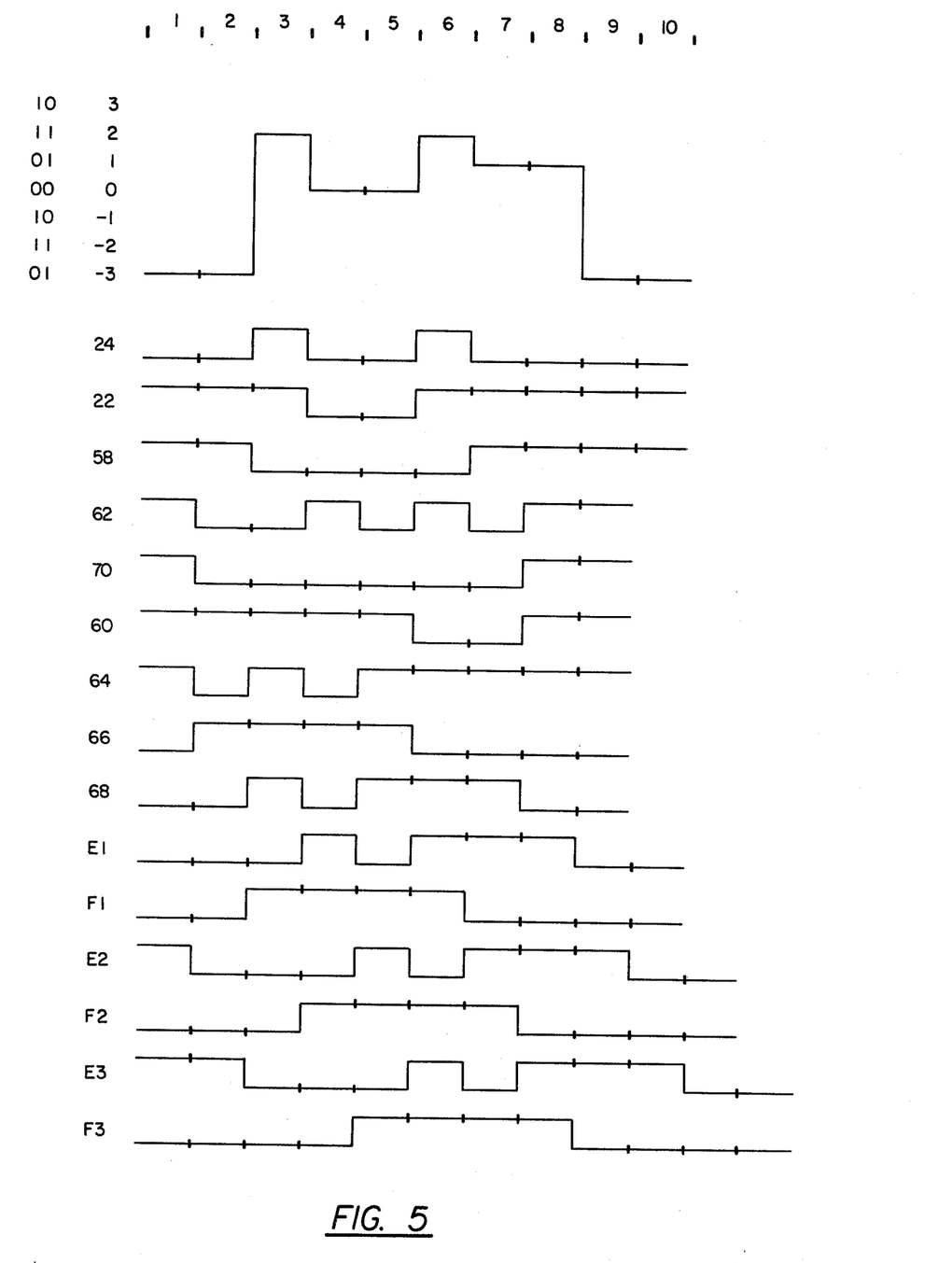
FIG. 5 is a waveform diagram illustrating the operation of the various gates and flip-flops shown in FIGS. 3 and 4 where no errors occur.
Figure 6:
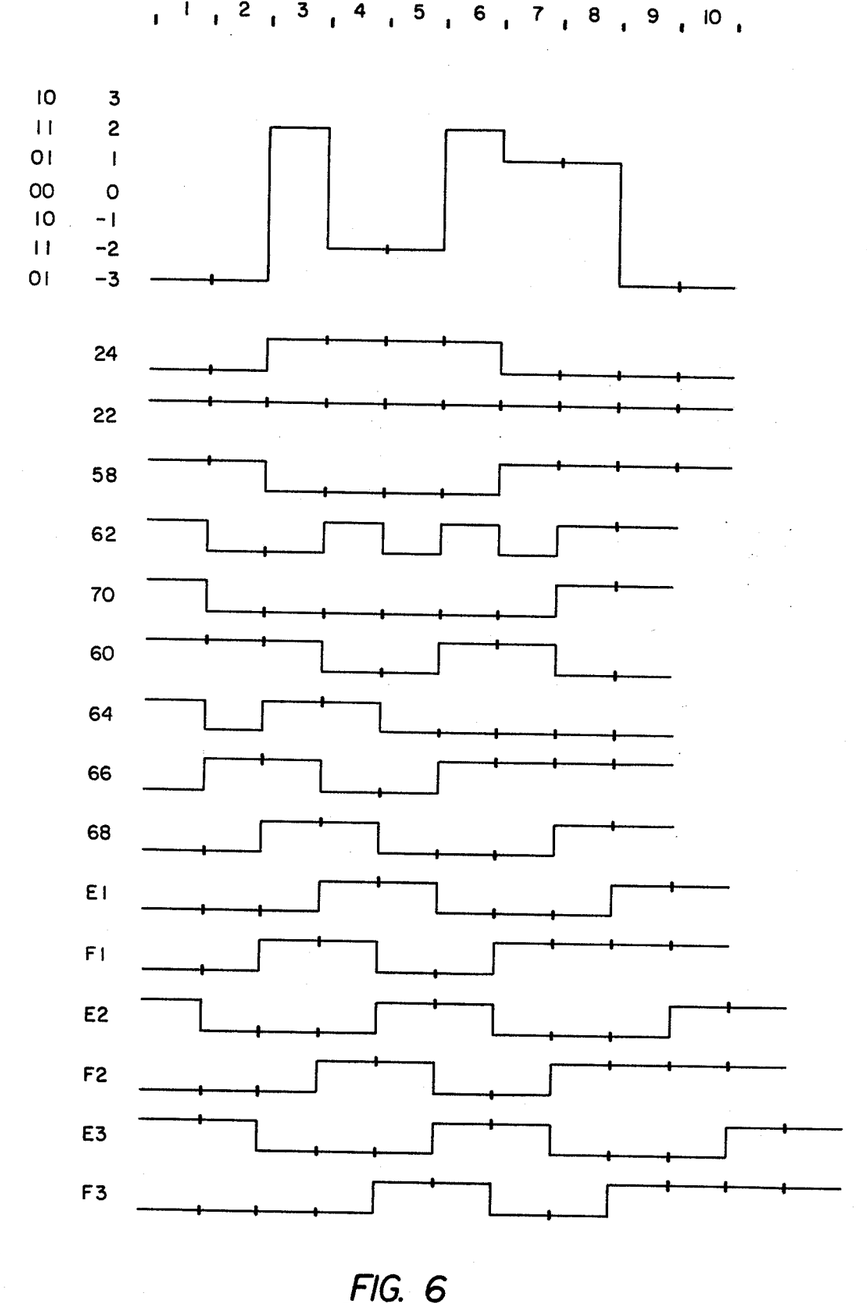
FIG. 6 is a waveform diagram illustrating the operation of the gates and flip-flops of FIGS. 3 and 4 when errors do occur.

Referring now to FIG. 3, the estimated waveform generator is shown in much greater detail. The reconstructed binary waveform A has been accepted and converted into two binary parallel channels and applied to paths 22 and 24. The estimate of the original transmitted waveform A is then processed using six exclusive-or (EX-OR) gates one AND gate (or two NAND gates arranged to provide an AND gate function) and six D-type flip-flops (bistable multivibrators). The operation of the gates and flip-flops can be understood with reference waveform diagram FIG. 5. This waveform diagram would actually be representative of the original 7-level signal which was generated at the transmitting end, then received without errors, and finally converted, as illustrated, for processing in the estimated waveform generator, FIG. 3. The binary waveforms are numbered or lettered in accordance with the path or function performed.

The purpose of processing in the sequential circuit shown is to convert $\hat{A}$ into $\hat{B}$ and $\hat{\Delta} \hat{B}$. Indeed, outputs E1 and F1 represent the $\hat{B}$ and outputs E3 and F3 represent $\hat{\Delta} \hat{B}$. The gating circuits in block 56 provide the encoding of the parallel binary channels and the flip-flops in delay 80 provide the ability to have the present and past digits available at the output of the estimated waveform generator. Note that for the encoding process feedback of the one interval delayed binary coded signals E2 and F2 are used.

Referring now to FIG. 4, it may seem that NAND gates 100 and 104 provide the comparison for the top slicer with the binary representation 1000, and gates 102 and 106 provide the comparison between the bottom slicer and the binary estimated waveform 0010. NAND gate 108 provides the output error indication whenever either of the two comparison circuits indicate that the received waveform and the estimated waveform at the top or bottom slicing levels are in disagreement. Processing of the binary equivalent of the estimated waveform and the comparison with the top or bottom level of the received waveform provides a result which may be expressed in Boolaen form as follows:

$$Y = \overline{(E1 \; \overline{F1} \; \overline{E3} \; \overline{F3})} \; T + \overline{(\overline{E1} \; \overline{F1} \; E3 \; \overline{F3})} \; L$$

Where
Y = the output of gate 108
T = output of the top slicer indicating presence of a top level
L = output of the bottom slicer indicating the presence of a bottom level It is apparent that there is always an error indication when T is present and the variables $E_i$ and $F_i$ are not the binary 1000 or when L is present and the same variables are not binary 0010.

In the event an error occurs, it is clear that one or more of the outputs E1, F1, E3 and F3 are incorrect. This suggests that the states of the flip-flops 88, 82, 92 and 86 are incorrect. To prevent error propagation the states of flip-flops 82 and 88 must be corrected. The states of flip-flops 86 and 92 need not be corrected, since in the next time slot following the next clock pulse the information stored there is obliterated. When the top level input is present during an error indication, the correct values of E1 should be "1" and that for F1 should be binary "0". To achieve this correct value, the clock pulse through gate 110 sets the most significant digit E1, or F/F (flip-flop) 88 via path 44. At the same time, the error output through gate 114 combined with a clock pulse through gate 116 resets the least significant digit F1, or flip-flop 82 via path 42. Thus, the correction process for flip-flops 82 and 88 is completed and the information stored therein is utilized two clock pulses later.

When the bottom level is present during an error indication, the correct value should be a binary "0" both for E1 and F1. Again, E1 or flip-flop 88 is reset using the clock pulse through gate 112 via path 45. At the same time, F1 or flip-flop 88 is also reset to "0" through gates 114 and 146 via path 42.

It should be noted that each error indication should be interpreted as an error of one of the four levels, 0, 1, 2 or 3. These levels are encoded at the transmitter in Gray code where $0 = 00, 1 = 01, 2 = 11$ and $3 = 10$. In this code adjacent levels differ only by one binary digit. Consequently, an adjacent level error, say from level 2 to level 3, results only in a single binary error. Non-adjacent level errors may result in two binary errors. However, systems of this nature are invariably operating at error rates equal to or better than $10^{-6}$. This implies that the signal-to-noise ratio is relatively good and, therefore, in the presence of noise having approximately Gaussian distribution, errors result predominantly from changes between adjacent levels. Since each such error implies a single binary error, the overall error rate approximates well the binary error rate. This is, for example, true for line of sight radio transmission.

While the invention has been particularly shown and described with reference to a preferred embodiment thereof, it will be understood by those skilled in the art, that changes in form and detail may be made therein without departing from the spirit and scope of the invention.

What is claimed is:

1. At a receiver, apparatus for detecting errors in a 7-level correlative signal, C, which comprises:
   means for deriving from the 7-level signal a pair of binary signals in parallel form;
   means for operating on said pair of binary signals to derive in binary form an estimate, $\hat{C}$, of a correlative 7-level signal in accordance with the following relation:

$$\hat{C} = \hat{B} - \overset{2}{\hat{\Delta}} \hat{B} \text{ (algebraic)}$$

where $\hat{B}$ represents the present digits in binary form;
   $\hat{\Delta} \hat{B}$ represents the past digits in binary form; and
   $\hat{\Delta}$ represents a delay of 2 T seconds and 1/T is the digit rate in digits/second;
   means for determining if the top and bottom levels of C and $\hat{C}$ occur at the same time; and
   means for providing an error output signal when $C \neq \hat{C}$ during the occurence of a top or bottom level of C.

2. Apparatus in accordance with claim 1 wherein means for operating further comprises:
- means for encoding the pair of binary signals to provide a pair of correlated signals;
- means for delaying said pair of correlated signals to obtain binary representations for the present digit, the digit one unit delayed, and the digits two units delayed; and
- means for feeding back into said for encoding means one state of the binary representation of the one unit delayed digits.

3. Apparatus in accordance with claim 2 wherein said means for comparing further comprises:
- slicing means for deriving an output whenever a to level or a bottom level occurs in 7-level signals, C;
- a first gating means having a first set of inputs from said delay means including present digits and digits two units delayed, an input from the top level output of said slicing means, and providing an output signal of one binary state when the inputs indicate that $C \neq \hat{C}$ at the top level occurrence, and an output signal of the opposite binary state for all other binary input conditions; and
- a second gating means having a second set of inputs from said delay means including present digits and digits two units delayed, an input from the bottom level output of said slicing means, and providing an output signal of one binary state when the inputs indicate that $C \neq \hat{C}$, and an output signal of the opposite binary state for all other binary input conditions.

4. Apparatus in accordance with claim 3 wherein said means for providing an error output further comprises:
- a third gating means having a first and second input connected, respectively, to the output of said first and second gating means, and providing an output whenever either the first or second gating means has an output signal of said one binary state; and
- means responsive to an error occurrence for changing the state of the present digits in said delay means.

5. In a digital communications system employing a 7-level correlative coded signal, C, a receiver decodes the 7-level signal to obtain a pair of binary output signals which represent the original data, excluding errors introduced during transmission, said decoder further providing a separate signal for each occurrence of either the top or the bottom level, apparatus for detecting errors which comprises:
- means for operating on said pair of binary signals to derive in binary form an estimate, $\hat{C}$, of a correlative 7-level signal in accordance with the following relation:

$$\hat{C} = \hat{B} - \overset{2}{\Delta} \hat{B} \text{ (algebraic)}$$

where $\hat{B}$ represents the present digit of the estimated wave in binary form;
$\overset{2}{\Delta} \hat{B}$ represents the past digits two intervals delayed; and
$\overset{2}{\Delta}$ represents 2T seconds delay where 1/T is the digit rate in digits per second;
- means for determining if the top and bottom levels of C with $\hat{C}$ occur at the same time; and
- means for providing an error output signal when $C \neq \hat{C}$ during the occurrence of a top or bottom level of C.

6. Apparatus in accordance with claim 5 wherein said means for operating further comprises:
- means for encoding the pair of binary signals to provide a pair of correlated signals;
- means for delaying said pair of correlated signals to obtain binary representations for the present digit, the digits one unit delayed, and the digits two units delayed; and
- means for feeding back into said means for encoding one state of the binary representation of the one unit delayed digits.

7. Apparatus in accordance with claim 6 wherein said means for comparing further comprises:
- slicing means for deriving an output whenever a top level or a bottom level occurs in the 7-level signal, C;
- a first gating means having a first set of inputs from said delay means including present digits and digits two units delayed, an input from the top level output of said slicing means, and providing an output signal of one binary state when the inputs indicate that $C \neq \hat{C}$ at the top level occurrence, and an output signal of the opposite binary state for all other binary input conditions; and
- a second gating means having a second set of inputs from said delay means including present digits and two unit delayed digits, an input from the bottom level output of said slicing means, and providing an output signal of one binary state when the inputs indicate that $C \neq \hat{C}$ at the bottom level occurrence, and an output signal of the opposite binary state for all other binary input conditions.

8. Apparatus in accordance with claim 7 wherein said means for providing an error output further comprises:
- a third gating means having a first and second input connected, respectively, to the output of first and second gating means, and providing an output whenever either the first or second gating means has an output signal of said one binary state; and
- means responsive to an error occurrence for changing the state of the present digits in said delay means.

* * * * *

UNITED STATES PATENT AND TRADEMARK OFFICE
CERTIFICATE OF CORRECTION

PATENT NO. : 4,110,691
DATED : August 29, 1978
INVENTOR(S) : Adam Lender

It is certified that error appears in the above-identified patent and that said Letters Patent are hereby corrected as shown below:

Column 7, line 9, after "said" insert -- means --; same line 9, after "encoding" delete "means"; line 14 delete "to" and substitute therefor --top--.

Column 8, line 9, delete "with" and substitute therefor --and--.

*Signed and Sealed this*

*Twenty-seventh* Day of *March 1979*

[SEAL]

Attest:

RUTH C. MASON
*Attesting Officer*

DONALD W. BANNER
*Commissioner of Patents and Trademarks*